United States Patent
Bailey et al.

(10) Patent No.: US 10,574,035 B2
(45) Date of Patent: Feb. 25, 2020

(54) HYBRID POWER AND FIBER OPTIC DISTRIBUTION PANELS

(71) Applicant: Appleton Grp LLC, Rosemont, IL (US)

(72) Inventors: Mark Bailey, Granbury, TX (US); Dorian Popi, Elmhurst, IL (US); Mark Garton, Yorkville, IL (US); Bill Leber, Vernon Hills, IL (US)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 16/271,547

(22) Filed: Feb. 8, 2019

(65) Prior Publication Data
US 2019/0372315 A1    Dec. 5, 2019

Related U.S. Application Data

(60) Provisional application No. 62/680,823, filed on Jun. 5, 2018.

(51) Int. Cl.
*H02B 1/20*    (2006.01)
*H01B 9/00*    (2006.01)
(Continued)

(52) U.S. Cl.
CPC ........... *H02B 1/202* (2013.01); *G02B 6/4416* (2013.01); *G02B 6/50* (2013.01); *H01B 7/02* (2013.01);
(Continued)

(58) Field of Classification Search
CPC .. A61M 2205/3576; H02J 7/025; H02J 50/12; H02J 5/005; H03H 7/40;
(Continued)

(56) References Cited

U.S. PATENT DOCUMENTS 4,975,629 A    12/1990    Callahan et al.
5,127,082 A    6/1992    Below et al.
(Continued)

FOREIGN PATENT DOCUMENTS

EP    3 327 732 A1    5/2015
JP    2004 304617 A    10/2004
WO    2015/009713 A1    1/2015

OTHER PUBLICATIONS

The International Search Report (ISR) with Written Opinion for PCT/US2019/026747 dated Jun. 27, 2019, pp. 1-16.
(Continued)

*Primary Examiner* — Adam B Dravininkas
(74) *Attorney, Agent, or Firm* — McDonnell Boehnen Hulbert & Berghoff LLP

(57) ABSTRACT

A system including a first hybrid power and fiber optic cable including a first plurality of power lines and a first plurality of pairs of fiber optic cable routed from a control center in a first location to a hybrid power and fiber optic distribution panel within a second location, wherein the first plurality of power lines are secured to a main lug connection within the hybrid power and fiber optic distribution panel, wherein the first plurality of pairs of fiber optic cable are secured to a fiber patch panel within the hybrid power and fiber optic distribution panel, and a second and third hybrid power and fiber optic cable including a plurality of power lines and a plurality of pairs of fiber optic cable are routed from the hybrid power and fiber optic cable distribution panel to a first and second junction boxes located within the second location.

16 Claims, 4 Drawing Sheets

(51) Int. Cl.
*H01B 7/02* (2006.01)
*G02B 6/44* (2006.01)
*G02B 6/50* (2006.01)
*H02G 1/06* (2006.01)
*H02G 3/04* (2006.01)
*H02G 3/08* (2006.01)

(52) U.S. Cl.
CPC ............... *H01B 9/005* (2013.01); *H02G 1/06* (2013.01); *H02G 3/0456* (2013.01); *H02G 3/081* (2013.01)

(58) Field of Classification Search
CPC .. B60L 2200/26; B60L 53/12; B60L 2250/16; F21Y 2115/10; F21Y 2103/10; Y10T 29/49083; Y10T 29/49826; Y10T 307/406; H05B 37/0227; H05B 37/0272; H05B 33/0854; H02B 1/202; H02G 1/06; H02G 3/0456; H02G 3/081; G02B 6/50; G02B 6/4416; H01B 7/02; H01B 9/005
See application file for complete search history.

(56) References Cited

U.S. PATENT DOCUMENTS

| | | |
|---|---|---|
| 5,233,511 A | 8/1993 | Bilas et al. |
| 5,394,503 A | 2/1995 | Dietz, Jr. et al. |
| 5,909,180 A | 6/1999 | Bailey et al. |
| 6,804,447 B2 | 10/2004 | Smith et al. |
| 2007/0280610 A1 | 12/2007 | Mallya et al. |
| 2013/0292435 A1* | 11/2013 | Zhang ................ B60R 7/084 224/277 |
| 2014/0241679 A1* | 8/2014 | Kachmar ............ G02B 6/2558 385/114 |
| 2016/0020858 A1* | 1/2016 | Sipes, Jr. ............ H04B 10/808 398/45 |
| 2019/0113689 A1* | 4/2019 | Chappell ............ G02B 6/3893 |

OTHER PUBLICATIONS

Belden Hybrid Cable Product Bulletin 2014.
Belden Hybrid Cable Technical Specification 2019 (representative of prior art hybrid cable).

* cited by examiner

HYBRID POWER AND FIBER OPTIC DISTRIBUTION PANELS

RELATED APPLICATIONS

This application claims priority to U.S. Provisional Application No. 62/680,823 filed on Jun. 5, 2018 and entitled "Hybrid Power and Fiber Optic Distribution Panels," the contents of which are incorporated by reference herein in their entirety.

FIELD

The present disclosure relates to the field of supplying power and data (through fiber optic cable) to machinery and electronic equipment in an industrial facility. More particularly, the present disclosure is directed to providing power and data through fiber optic cable to a hybrid power and fiber optic distribution panel in a hazardous location and from there to machinery and electronic equipment located in the hazardous location.

BACKGROUND

In typical industrial facility designs, the method for routing electrical power and fiber optic data cables to the field instrumentation is through separate, and independently installed, power and data distribution systems. In facilities with hazardous environments this involves very long individual runs of power cable from the non-hazardous area of the facility to the hazardous areas, as well as very long individual runs of optical fiber cable from the non-hazardous area of the facility to the hazardous areas. Many times these runs are through buried trenches or through conduit systems making these individual runs of cabling expensive and time-consuming to install. Costs for a typical facility can easily run into several million dollars.

Therefore, it would be desirable to provide power cable and optical fiber cable to a hazardous location more efficiently, with reduced complexity and installation costs.

SUMMARY

The present embodiments advantageously combine power and fiber optic cable into one trunk line for hazardous areas within industrial facilities. The single trunk line is routed from a non-hazardous location within the facility to a hybrid power and fiber optic distribution panel in the hazardous area. The combined cable replaces the multiple individual cables typically used. As a result, the cost and complexity of routing the power and data (fiber optic cable) throughout the facility in hazardous locations is greatly reduced.

In practice, the common trunk line containing both copper power cables and fiber optic cables are routed from a non-hazardous area of the facility to a hybrid power and fiber optic distribution panel in a hazardous area of the facility. Additional hybrid power and fiber optic cables combining both power and fiber optic cables branch off from the hybrid power and fiber optic distribution panel and are directed to smart junction boxes associated with the various machinery and electronic equipment within the facility.

In one aspect, a system of routing hybrid power and fiber optic cable to a hybrid power and fiber optic distribution panel is provided including a first hybrid power and fiber optic cable including a first plurality of power lines and a first plurality of pairs of fiber optic cable, wherein the first hybrid power and fiber optic cable is routed from a power control center in a first location to a hybrid power and fiber optic distribution panel within a second location, wherein the first plurality of power lines are secured to a main lug connection within the hybrid power and fiber optic distribution panel, wherein the first plurality of pairs of fiber optic cable are secured to a fiber patch panel within the hybrid power and fiber optic distribution panel, a second hybrid power and fiber optic cable including a second plurality of power lines and a second plurality of pairs of fiber optic cable are routed from the hybrid power and fiber optic cable distribution panel to a first junction box located within the second location, and a third hybrid power and fiber optic cable including a third plurality of power lines and a third plurality of pairs of fiber optic cable are routed from the hybrid power and fiber optic cable distribution panel to a second junction box located within the second location.

In another aspect, a hybrid power and fiber optic cable is provided including a plurality of power lines and a plurality of pairs of fiber optic cable positioned within an outer jacket.

In a further aspect, a method of routing hybrid power and fiber optic cable to a hybrid power and fiber optic distribution panel is provided including the steps of (i) routing a first hybrid power and fiber optic cable including a first plurality of power lines and a first plurality of pairs of fiber optic cable from a power control center in a first location to a hybrid power and fiber optic distribution panel within a second location; (ii) securing the first plurality of power lines to a main lug connection within the hybrid power and fiber optic distribution panel; (iii) securing the first plurality of pairs of fiber optic cable to a fiber patch panel within the hybrid power and fiber optic distribution panel; (iv) routing a second hybrid power and fiber optic cable including a second plurality of power lines and a second plurality of pairs of fiber optic cable from the hybrid power and fiber optic cable distribution panel to a first junction box located within the second location; and (v) routing a third hybrid power and fiber optic cable including a third plurality of power lines and a third plurality of pairs of fiber optic cable from the hybrid power and fiber optic cable distribution panel to a second junction box located within the second location.

DETAILED DESCRIPTION

Figure 1:
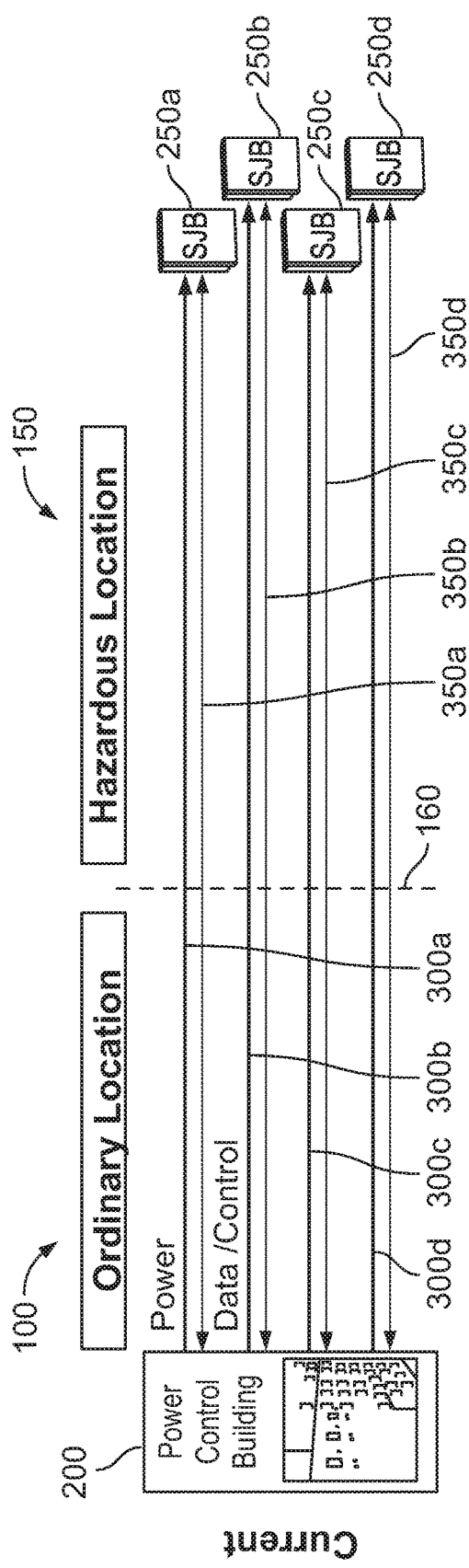
FIG. 1 is a depiction of a typical way of routing power and fiber optic cable from a non-hazardous area of a facility to a hazardous area of the facility.

FIG. 1 is a depiction of a typical way of routing power and fiber optic cable from a non-hazardous area of a facility 100 to a hazardous area of the facility 150. In particular, the method for routing electrical power and fiber optic data cables to the field instrumentation is through separate, and independently installed, power and data distribution systems. Thus, typically, power line 300a separately extends through a conduit or trench from control room 200 in non-hazardous location 100 to smart junction box 250a located in hazardous location 150 through dividing line 160 between the two locations. Similarly, fiber optic cable 350a separately extends from control room 200 to smart junction box 250a.

Additionally, power line 300b separately extends through a conduit or trench from control room 200 to smart junction box 250b located in hazardous location 150. Similarly power line 350b separately extends from control room 200 to smart junction box 250b.

Additionally, power line 300c separately extends through a conduit or trench from control room 200 to smart junction box 250c located in hazardous location 150. Similarly power line 350c separately extends from control room 200 to smart junction box 250c.

Further, power line 300d separately extends through a conduit or trench from control room 200 to smart junction box 250d located in hazardous location 150.

Similarly power line 350d separately extends from control room 200 to smart junction box 250d.

In this example using four smart junctions boxes 250a-d associated with machinery and electrical equipment located in hazardous location 150, four separate power lines 300a-d and four separate fiber optic cables 350a-d extend in separate conduit or trenches from control room 200 in non-hazardous location 100 to four smart junction boxes 250a-d located in hazardous location 150. As used herein, the terms "optical fiber" and "fiber optic" are used interchangeably.

As a result, the installation shown in FIG. 1 involves very long individual runs of power lines 300a-d from the non-hazardous area of the facility 100 to the smart junction boxes 250a-d in hazardous area 150, as well as very long individual runs of optical fiber cable 350a-d from the non-hazardous area of the facility 100 to the smart junction boxes 250a-d in hazardous area 150. Many times these runs are through buried trenches or through conduit systems making these individual runs of cabling expensive and time consuming to install.

Figure 2:
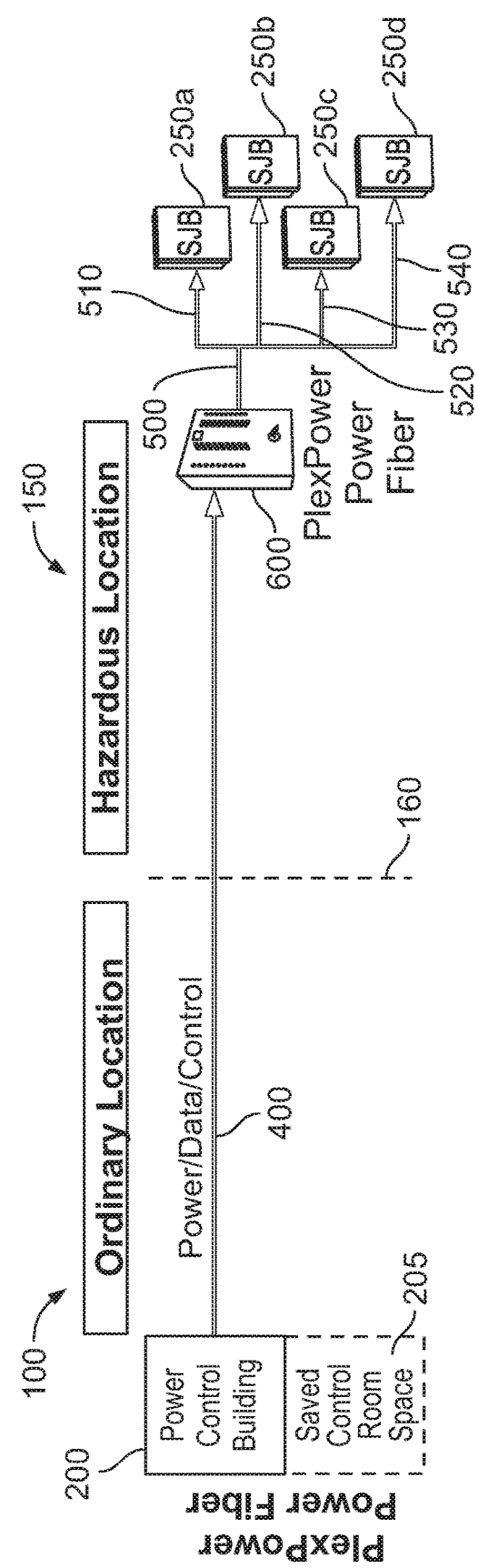
FIG. 2 is a depiction of an improved way of routing power and fiber optic cable from a non-hazardous area of a facility to a hazardous area of the facility, according to an example embodiment.

FIG. 2 is a depiction of an improved way of routing power and fiber optic cable from a non-hazardous area of a facility 100 to a hazardous area of the facility 150. In FIG. 2, power lines and optical fiber lines are advantageously routed from control room 200 in a single cable 400 from non-hazardous location 100 through dividing line 160 to a hybrid power and fiber optic distribution panel 600 located in hazardous location 150.

Separate hybrid power and fiber optic cables are routed from hybrid power and fiber optic distribution panel 600 to smart junction boxes 250a-d through hybrid power and fiber optic cables 510, 520, 530, and 540, respectively. As a result of this system of delivering power and fiber optic cable to smart junction boxes 250a-d, the use of eight separate runs of power lines and optical fiber cable to hazardous location 150 is eliminated and only a single cable 400 containing both power lines and optical fiber cable is used to route the power lines and optical fiber cable into the hazardous location. Thus, the use of common cable 400 replaces the multiple individual cables typically used as illustrated in FIG. 1. This greatly reduces the cost and complexity of routing the power and data (optical fiber) throughout the facility in hazardous locations.

The present embodiments advantageously combine the power conductors and fiber optic data cabling into a common trunk cable, hybrid power and optical fiber cable 400, which extends from the control room 200 in non-hazardous area 100 to a central distribution panel, hybrid power and optical fiber distribution panel 600, in the hazardous area 150. Another common power feeder line, hybrid power and optical fiber 500, feeds branch circuits 510, 520, 530, and 540 that exit the hybrid power and optical fiber distribution panel 600 and are routed to smart junction boxes 250a-d. Additionally, hybrid power and optical fiber 400 also includes multiple fiber optic data transmission pairs that are connected to a fiber optic distribution hub located within the same hybrid power and optical fiber distribution panel 600 the power lines are connected to. The outgoing data fiber pairs and the branch power circuits are again combined into common local distribution cables 510, 520, 530, and 540 that connect to instrumentation panels throughout the facility. This bundling of power and data fiber in the distribution cables 400 and 500 results in a 50% reduction in the number of cables that are needed to feed the instrumentation junction boxes, smart junction boxes 250a-d. The saved control room space is illustrated at portion 205 of control room 200.

Figure 3:
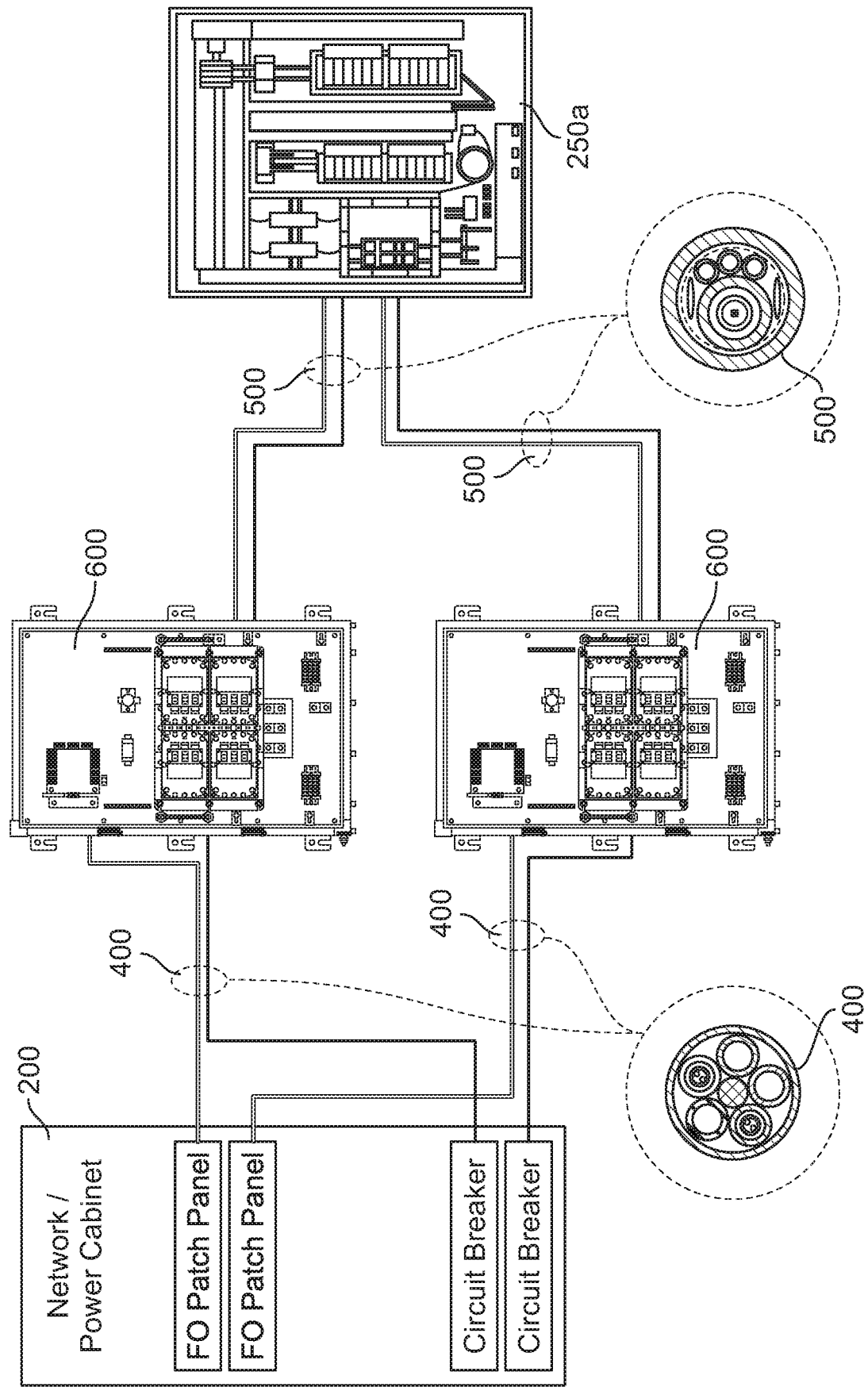
FIG. 3 is a schematic drawing showing hybrid power and fiber optic cable 400 being routed from a control room 200 to a pair of hybrid power and fiber optic distribution panels 600, as well as power and fiber optic cable 500 being routed to smart junction box 250*a*, according to an example embodiment.

FIG. 3 is a schematic drawing showing hybrid power and fiber optic cable 400 being routed from a control room 200 to a pair of hybrid power and fiber optic distribution panels 600, as well as power and fiber optic cable 500 being routed to smart junction box 250a, according to an example embodiment.

Figure 4:
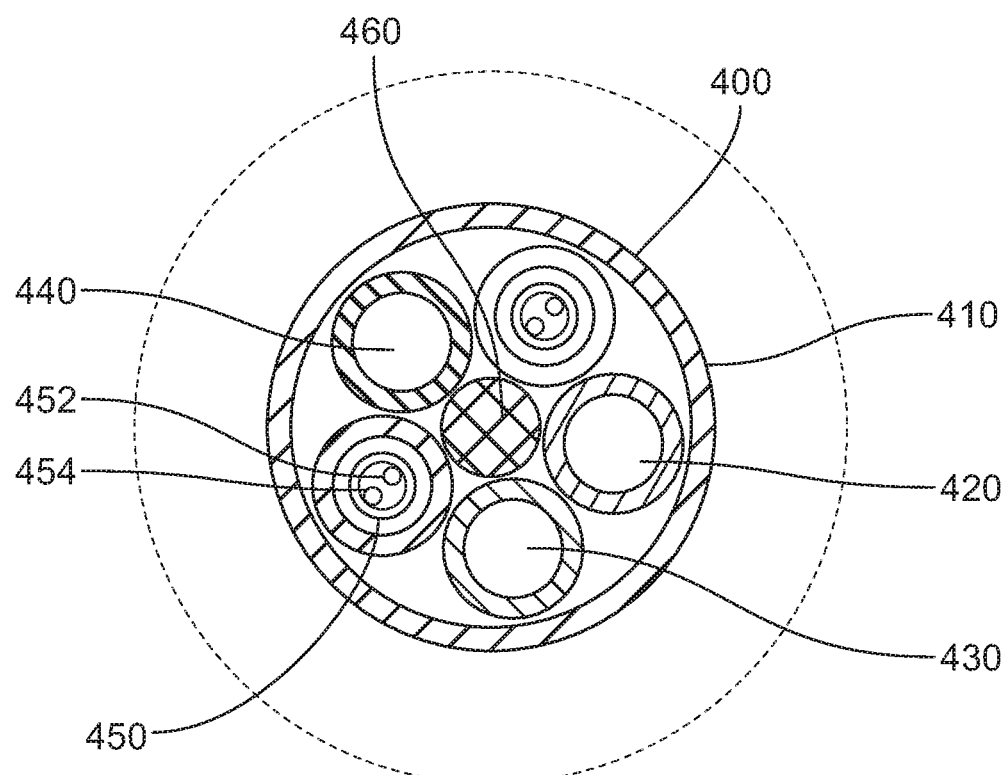
FIG. 4 is a cross-sectional view of hybrid power and fiber optic cable 400, according to an example embodiment.

FIG. 4 is a cross-sectional view of hybrid power and fiber optic cable 400, according to an example embodiment. Hybrid power and fiber optic cable 400 includes insulated copper wires 420 and 440 and ground wire 430. Also included is a pair of insulated fiber optic cable pairs with fiber optic cable 450 having fiber optic cables 452 and 454. A filler 460 is centrally located between the copper wires and fiber optic cables. The copper wires, pairs of fiber optic cables and filler are all contained within outer jacket 410 resulting in a single cable having both power wires and optical fiber cables.

Depending on the application, any number of fiber optic pairs may be included in hybrid power and fiber optic cable 400 although only two are shown in FIG. 4. For example, 48 pairs of optical fibers could be used, if there are 48 junction boxes to provide fiber optic cabling to within the hazardous location 150.

Figure 5:
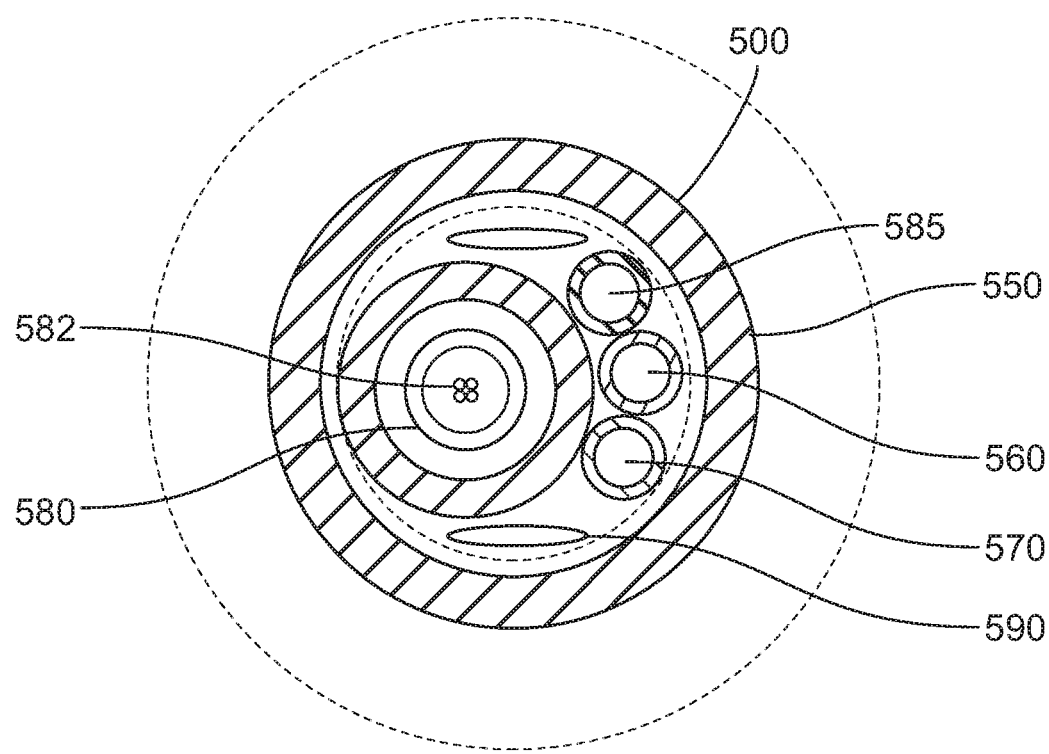
FIG. 5 is a cross-sectional view of hybrid power and fiber optic cable 500, according to an example embodiment.

FIG. 5 is a cross-sectional view of hybrid power and fiber optic cable 500, according to an example embodiment. Hybrid power and fiber optic cable 500 includes insulated copper wires 560 and 585 and ground wire 570. Also included is an insulated fiber optic cable 580 having two pairs of fiber optic cables 580. Fillers 590 are used to pack the power wires and fiber optic cable into a desired position. The copper wires, fiber optic cable and fillers are all contained within outer jacket 550 resulting in a single cable having both power wires and optical fiber cables.

Depending on the application, any number of fiber optic pairs may be included in hybrid power and fiber optic cable 500 although only two are shown in FIG. 5. For example, additional pairs of optical fibers could be used, if required at smart junction box 250a.

Figure 6:
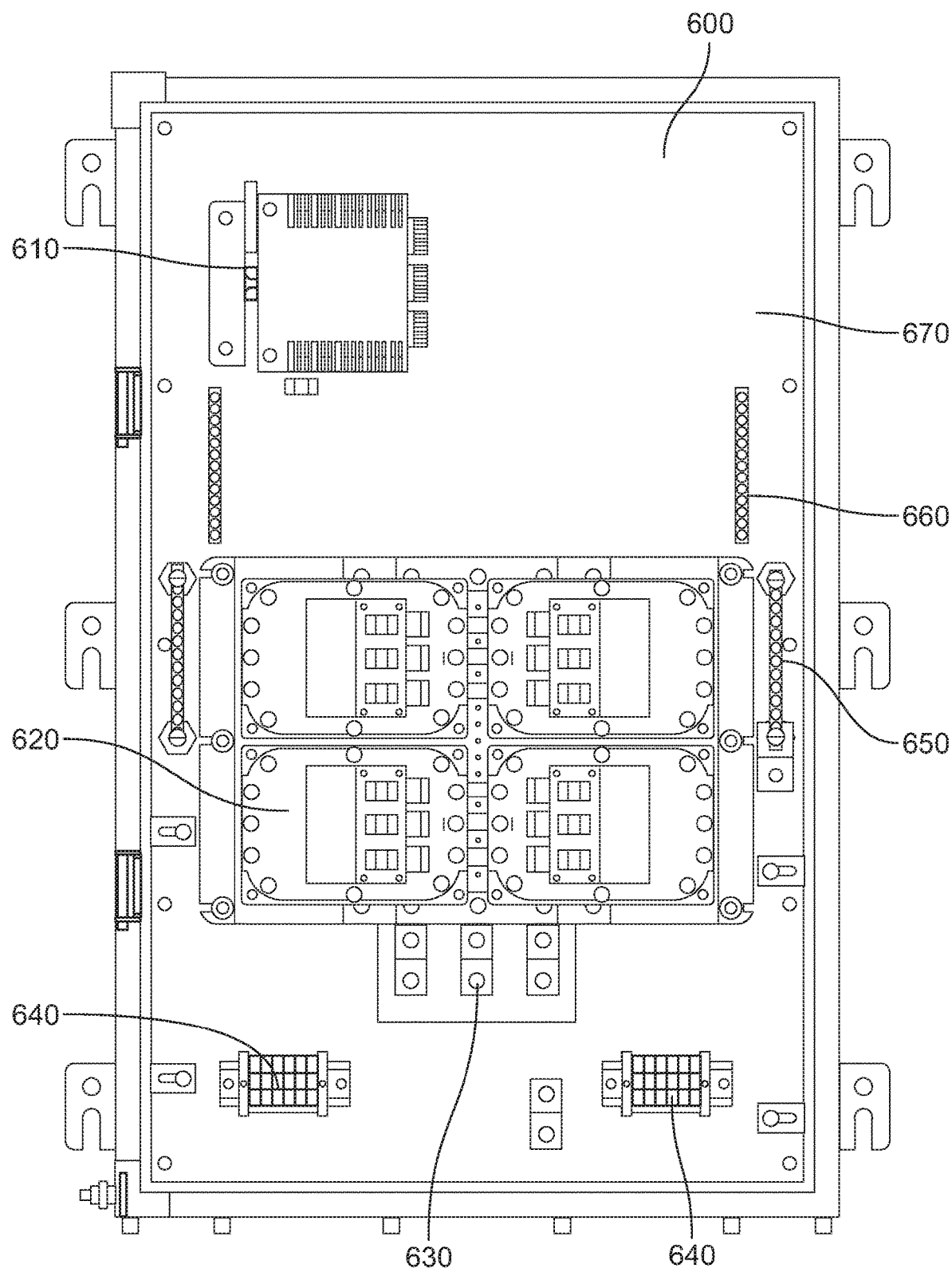
FIG. 6 is a side view of hybrid power and fiber optic distribution panel 600, according to an example embodiment.

FIG. 6 is a side view of hybrid power and fiber optic distribution panel 600 showing the layout of the various components contained therein, according to an example embodiment. Hybrid power and fiber optic distribution panel 600 may be made of a stainless steel housing 670. An optical fiber patch panel 610 is shown in the upper left of distribution panel 600. Pairs of optical fiber cables from hybrid power and fiber optic cable 400 are routed into optical fiber patch panel 610 at the bottom lug extending downwardly from the optical fiber patch panel. The copper wires from hybrid power and fiber optic cable 400 are attached to main lug connection 630 which is in turn electrically connected to sealed circuit breaker module 620. Field power terminal blocks 640 are also included within the housing 670. A pair of ground bars 660 and a pair of neutral bars 650 are included within the housing 670 as well. Power wires and fiber optic cables are routed from housing 670 as hybrid power and optical fiber cable 500 and branched off to smart junction boxes within hazardous location 150.

As used herein the term "hazardous location" is defined by the National Electric Code (NEC) and covers both Class I Division 1 and Class I Division 2 applications defined as of the filing date of this application.

The present embodiments provide significant advantages and benefits over typical methods of routing power lines and fiber optic cable to a hazardous location. These advantages and benefits include a reduction in the number of long cable runs required for installation of the power lines and fiber optic cable, and a materials and labor saving during installation of the hybrid power and fiber optic cable. In addition, faster and safer installation is achieved because conduit seals are not required. Furthermore, labor savings are achieved for the seal pouring and faster time for equipment to be used. Saved space in the expensive power control buildings is also achieved. Moreover, improved safety for electricians and maintenance team members is achieved. Finally, the modular design construction provides for faster commission and installation of the system.

Additional applications for this concept include distribution of wireless connectivity where the wireless access point can be included in the hybrid power and fiber optic distribution panel. The power lines and fiber optic cable entering the distribution panel can be used to connect a wireless access point to power and data (optical fiber) feed lines. This concept is suitable for manufacturing data networks (level 3) and business data networks (level 4) that run independently from the control data networks within industrial process facilities. (Purdue Enterprise Reference Architecture (PERA).

The hybrid power and fiber optic distribution panels can be further enhanced by the use of connector systems that make simultaneous connection of power and fiber optic lines to the distribution panel.

We claim:

1. A system of routing hybrid power and fiber optic cable to a hybrid power and fiber optic distribution panel comprising:
   a first hybrid power and fiber optic cable including a first plurality of power lines and a first plurality of pairs of fiber optic cable;
   wherein the first hybrid power and fiber optic cable is routed from a power control center in a first location to a hybrid power and fiber optic distribution panel within a second location;
   wherein the first plurality of power lines are secured to a main lug connection within the hybrid power and fiber optic distribution panel;
   wherein the first plurality of pairs of fiber optic cable are secured to a fiber patch panel within the hybrid power and fiber optic distribution panel;
   a second hybrid power and fiber optic cable including a second plurality of power lines and a second plurality of pairs of fiber optic cable are routed from the hybrid power and fiber optic cable distribution panel to a first junction box located within the second location; and
   a third hybrid power and fiber optic cable including a third plurality of power lines and a third plurality of pairs of fiber optic cable are routed from the hybrid power and fiber optic cable distribution panel to a second junction box located within the second location.

2. The system of claim 1, wherein the first location is a non-hazardous location and the second location is a hazardous location.

3. The system of claim 2, wherein the main lug connection is attached to a breaker module within the hybrid power and fiber optic cable distribution panel.

4. The system of claim 2, wherein a pair of field power terminal blocks are positioned within the hybrid power and fiber optic distribution panel.

5. The system of claim 2, wherein a ground bar and a neutral bar are positioned within the hybrid power and fiber optic distribution panel.

6. The system of claim 2, wherein the hazardous location is an NEC Class I Division 1 and/or Class I Division 2 location.

7. The system of claim 1, wherein the first hybrid power and fiber optic cable contains a pair of copper wires and a ground wire and a plurality of pairs of fiber optic cable surrounded by an outer jacket.

8. The system of claim 1, wherein the second hybrid power and fiber optic cable contains a pair of copper wires and a ground wire and a plurality of pairs of fiber optic cable surrounded by an outer jacket; and
   wherein the third hybrid power and fiber optic cable contains a pair of copper wires and a ground wire and a plurality of pairs of fiber optic cable surrounded by an outer jacket.

9. A method of routing hybrid power and fiber optic cable to a hybrid power and fiber optic distribution panel comprising the steps of:
   routing a first hybrid power and fiber optic cable including a first plurality of power lines and a first plurality of pairs of fiber optic cable from a power control center in a first location to a hybrid power and fiber optic distribution panel within a second location;
   securing the first plurality of power lines to a main lug connection within the hybrid power and fiber optic distribution panel;
   securing the first plurality of pairs of fiber optic cable to a fiber patch panel within the hybrid power and fiber optic distribution panel;
   routing a second hybrid power and fiber optic cable including a second plurality of power lines and a second plurality of pairs of fiber optic cable from the hybrid power and fiber optic cable distribution panel to a first junction box located within the second location; and
   routing a third hybrid power and fiber optic cable including a third plurality of power lines and a third plurality of pairs of fiber optic cable from the hybrid power and fiber optic cable distribution panel to a second junction box located within the second location.

10. The method of claim 9, wherein the first location is a non-hazardous location and the second location is a hazardous location.

11. The method of claim 10, where the hazardous location is an NEC Class I Division 1 and Class I Division 2 location.

12. The method of claim 10, wherein the main lug connection is attached to a breaker module within the hybrid power and fiber optic cable distribution panel.

13. The method of claim 10, wherein a pair of field power terminal blocks are positioned within the hybrid power and fiber optic distribution panel.

14. The method of claim 10, wherein a ground bar and a neutral bar are positioned within the hybrid power and fiber optic distribution panel.

15. The method of claim 10, wherein the first hybrid power and fiber optic cable contains a pair of copper wires and a ground wire and a plurality of pairs of fiber optic cable surrounded by an outer jacket.

16. The method of claim 10, wherein the second hybrid power and fiber optic cable contains a pair of copper wires and a ground wire and a plurality of pairs of fiber optic cable surrounded by an outer jacket; and wherein the third hybrid power and fiber optic cable contains a pair of copper wires and a ground wire and a plurality of pairs of fiber optic cable surrounded by an outer jacket.

* * * * *